United States Patent [19]
Blake et al.

[11] Patent Number: 5,880,060
[45] Date of Patent: Mar. 9, 1999

[54] COMPOSITIONS TO REMOVE HEAVY METALS AND RADIOACTIVE ISOTOPES FROM WASTEWATER

[76] Inventors: Barbara Blake; Alexander Blake, both of 4 Walnut Hollow Ln., Holmdel, N.J. 07733; William John Lacy, 9114 Cherry Tree Dr., Alexandria, Va. 22309

[21] Appl. No.: 704,127

[22] Filed: Aug. 28, 1996

[51] Int. Cl.⁶ .............................. B01J 20/10; C02F 5/02; C02F 1/42; G21F 9/00
[52] U.S. Cl. ..................... 502/411; 502/405; 502/407; 502/202; 502/242; 502/250; 252/175; 588/9; 588/13; 588/14; 588/15; 210/682; 210/688
[58] Field of Search ................................ 210/666, 682, 210/688; 502/407, 411, 405, 400, 202, 250, 242; 588/9, 13, 14, 15; 252/175

[56] References Cited

U.S. PATENT DOCUMENTS

| | | | |
|---|---|---|---|
| 4,765,908 | 8/1988 | Monick et al. | 210/666 |
| 5,087,375 | 2/1992 | Weinwurm | 210/688 |

*Primary Examiner*—Glenn Caldarola
*Assistant Examiner*—In Suk Bullock

[57] ABSTRACT

Treatment compositions and a method are provided for the removal of a plurality of heavy metals and radioactive isotopes from wastewater. The treatment compositions comprise an alkali; adsorbents, such as montmorillonite and illite clays; catalysts, such as polyelectrolytes and sodium carbonate; one or more flocculants, such as a metal salt and calcium hydroxide; zirconium as a chelating and complexing agent; and boron as a neutron absorbent. The selected composition is introduced into and mixed with the wastewater, which is then filtered to produce a sludge containing the contaminants.

2 Claims, No Drawings

5,880,060

COMPOSITIONS TO REMOVE HEAVY METALS AND RADIOACTIVE ISOTOPES FROM WASTEWATER

BACKGROUND OF THE INVENTION

This invention relates to wastewater treatment and, particularly, to the removal of a plurality of heavy metals and radioactive isotopes from wastewater to produce a sludge containing the contaminants. Many industries produce wastewaters containing heavy metals and/or radioactive material. Environmental laws regulate the discharge of wastewater containing heavy metals and/or radioactive isotopes. Wastewater containing heavy metals are generated by a wide variety of industries, such as metal finishing, automobile manufacturing, electronics manufacturing, textile industry and others. Wastewaters containing radioactive isotopes are generated by the mining of ore, refining of ore, milling, wash-downs, fuel preparation, cooling waters, as well as hospitals and research facilities. A combination of heavy metals and radioactive material is often present in run-off ponds at mining areas.

The problem is the considerable volume of wastewater containing heavy metals and/or radioactive material throughout the world and the lack of effective and economical treatment and, more particularly, the removal of heavy metals and the removal of radioactive isotopes from the wastewater, separately or in combination.

The present invention obviates these inherent problems by providing an effective wastewater treatment method capable of removing a plurality of diverse heavy metals and radioactive isotopes from wastewater and fixing or adsorbing same onto a usually stable sludge, thus rendering the water free of heavy metals and radioactive material. These waters can then be safely discharged or, in many cases, recycled, which results in additional savings to industry and in the protection of natural resources, the public health and the environment.

SUMMARY OF THE INVENTION

The present invention provides treatment compositions and a method for the removal of heavy metals and radioactive isotopes, separate or in combination, from wastewater. The treatment compositions of this invention comprise effective amounts of layer lattice type clays, particularly naturally occurring montmorillonite; illite and vermiculite clay; one or more flocculants; one or more catalysts; a binder and sealer; a neutron absorbent; and a chelating and complexing agent.

More specifically, the treatment compositions comprise 15 to 40% naturally occurring montmorillonite; 1 to 5% of one or more polyelectrolytes; 5 to 35% calcium hydroxide; 5 to 35% of a metal salt; 1 to 5% of sodium carbonate; 1 to 5% boron; 1 to 5% zirconium; 1 to 8% silica gel; 11 to 36% illite clay.

It is to be understood that the above indicated percentages refer to each component's percentage of the total treatment composition as used to treat the wastewater. It is also to be understood that the above percentages are approximations, with deviations being permitted within the scope of the invention. Also, it is to be understood that compositions for particular treatment applications may not include all of the listed components.

The treatment compositions and method of the present invention are capable of removing heavy metals and radioactive isotopes from wastewater effectively. The method of this invention includes the introduction into the wastewater, containing one or more heavy metals and/or radioactive isotopes, the treatment composition of the present invention. The contaminated wastewater, with the treatment composition added, is agitated for a predetermined length of time, usually four minutes. The floc containing the contaminants is then allowed to settle in the same tank. After completion of the settling phase, the supernatant is then discharged. Upon completion of the supernatant discharge, the sludge containing the contaminants is discharged from the treatment vessel to a filtration and dewatering device. The supernatant and filtrate can be discharged into a POTW, a natural body of water or into the ground or, in many cases, recycled.

One of the mechanisms involved is ion exchange. Ion exchange is the exchange or transfer of an ion or charged particle held by a negative charge near a mineral surface with one that is present in a solution in contact with the material. This process is reversible, that is, cations and anions are interchangeable between mineral surfaces and solutions. The exchanges that can take place in any particular electrolyte and with a specific mineral are controlled by physiochemical laws.

The property of ion exchange results from a charge deficiency within the lattice of the clay mineral. Usually steric relationships preclude the penetration of the crystal lattice by counterions, resulting in the exchange deficiency being effectively diffused over the surface of the particle. The charge deficiency is therefore satisfied by the formation of an electric double layer at the interface between the crystal lattice and the solution.

The process of ion exchange may occur between the ions on two mineral surfaces in contact and also between the mineral surface and root hairs and is an important process in plant nutrition. Cation exchange capacity is defined as the amount of exchangeable cations, expressed as milliequivalents per gram or per 100 grams of material (clay, soil or mineral) determined experimentally at pH 7.

The determination of the total exchange capacity of a clay or other mineral is more simple and rapid than determination of the common exchangeable cations, i.e., $Ca^{++}$, $Mg^{++}$, $Na^+$, $K^+$, or $H^+$. Important to an understanding of ion-exchange phenomena is the fact that the silicate structures which make up clay minerals, are determined by the ratios of the positive to the negative ions.

Shale and soil materials, when moist, are usually charged electro-negatively (zeta potential). The ion exchange capacity in clays is due to: (1) broken bonds at the edges of silica-alumina sheets, (2) substitution within the lattice structure of a trivalent or quadrivalent ions resulting in unbalanced charges within the clay unit, and replacement of the hydrogen of exposed hydroxyl groups by a cation.

The system employed in the present invention is basic. The system usually requires a vessel or tank which functions as a reaction and settling tank, a high speed agitator to assure a proper distribution of the treatment composition and a filtration/dewatering device. In the case of large wastewater volume, a modular design, meaning more than one reaction vessel, which function alternately, may be used.

DESCRIPTION OF THE PREFERRED EMBODIMENTS

The process and treatment compositions of the present invention are capable of removing heavy metals and radioactive isotopes from a variety of wastewaters that emanate from diverse manufacturing processes. Depending on the particular contaminants in a wastewater, the treatment composition may be altered to remove the specific contaminants. As used herein, contaminants will include barium, cadmium, chromium, aluminum, iron, copper, cesium, cobalt, iodine, lead, mercury, molybdenum, nickel, rhodium, selenium, silver, strontium, vanadium and zinc. The compositions of the present invention may be able to remove additional contaminants, not mentioned above. However, this has to be determined in future tests.

For an effective and efficient removal of the contaminants from wastewater, the treatment compositions comprise effective amounts of montmorillonite; illite and/or vermiculite clay; one or more flocculants; one or more catalyst; a neutron absorbent; a chelating and complexing agent; a binder and sealer. The montmorillonite is a naturally occurring montmorillonite with a silica content of at least sixty percent, which is also known as drilling mud or drilling gel, and which functions in the composition of the present invention as primary adsorbent. In the present invention, illite and vermiculite clays, which are layer lattice type clays, as is the montmorillonite, are used for their excellent coagulation properties and the layer lattice spacing as adsorbents. Illite and vermiculite clay which also have strong base exchange properties and, because of their large surface area, which is charged, perform as excellent adsorbents of heavy metals and radioactive isotopes. The flocculants are calcium hydroxide and a metal salt, such as and most preferably, aluminum sulfate. The catalysts are one or more polyelectrolytes and sodium carbonate. The polyelectrolyte is a nonionic or an anionic or cationic polyelectrolyte or a combination thereof. The sodium carbonate functions as a catalyst for the montmorillonite and the layer lattice structured clays, as well as a precipitation aid. Preferably, the percent weight of the components are 15 to 40% montmorillonite, 11 to 36% illite clay, 5 to 35% of flocculants, 1 to 5% of catalysts, 1 to 5% of boron, 1 to 5% of a chelating and complexing agent, and 1 to 8% of a binder and sealer. Boron is used in the present invention as a neutron absorbent since it has a high neutron capture cross section. The chelating and complexing agent in the composition of the present invention is zirconium. The binder and sealer in the present invention is silica gel which has the ability to adsorb moisture, accumulate finely divided solids and significantly reduce the leachability of the resultant solid precipitate.

The preferred treatment compositions comprise:
(a) About 15 to 40% of montmorillonite
(b) About 11 to 36% of illite clay
(c) About 5 to 35% of a metal salt
(d) About 5 to 35% of calcium hydroxide
(e) About 1 to 5% of one or more polyelectrolyte
(f) About 2 to 5% of sodium carbonate
(g) About 1 to 5% of boron
(h) About 1 to 5% of zirconium
(i) About 1 to 8% of silica gel If the montmorillonite is 40%, the other components are selected to total 60% of the total composition. The preferred, naturally occurring montmorillonite is a drilling mud or drilling gel with a silica content of at least 60%. The preferred clay is illite clay.

Included within the preferred treatment compositions are:
(a) About 15 to 40% montmorillonite;
(b) About 5 to 35 metal salt, preferably aluminum sulfate;
(c) About 5 to 35% calcium hydroxide;
(d) About 1 to 5% one or more polyelectrolyte;
(e) About 2 to 5% sodium carbonate and more preferably 3 to 4%;
(f) About 1 to 5% boron;
(g) About 1 to 5% zirconium;
(h) About 11 to 36% illite clay;
(i) About 1 to 8% silica gel;

In the more preferred treatment composition, the preferred montmorillonite is a drilling mud or drilling gel with a high silica content of preferably 60% or more. The preferred other layer lattice type clay is illite clay. The flocculants are a metal salt, most preferably aluminum sulfate and calcium hydroxide. The preferred catalysts are one or more polyelectrolyte which may be nonionic, anionic or cationic or a combination thereof, depending on the application and contaminants to be removed, and sodium carbonate. The preferred neutron absorbent of the present invention is boron. The preferred treatment compositions of the present invention include zirconium as a chelating and complexing agent. The preferred binder and sealer is silica gel.

Preferably, the components of the treatment compositions are of standard to fine commercial mesh. However, one or more components may vary in mesh size. Preferably, the combined percent weight of the layer lattice type clays, montmorillonite and illite clay, is at least 51% of the total weight of the composition. Preferably, the percent weight of the montmorillonite is at least 15% of the total composition.

Not being bound by theory, it is believed that the montmorillonite is the primary adsorbent since it is structured and layered. The illite clays are excellent coagulaants and adsorbents because of their strong base exchange properties and large, charged surface area.

The preferred flocculants are a metal salt, most preferably aluminum sulfate and calcium hydroxide. The catalysts are one or more polyelectrolytes and sodium carbonate.

Most preferably, the neutron absorbent, in the compositions of the present invention, is boron. Boron is a well known neutron absorbent with a high neutron capture cross section.

The preferred chelating and complexing agent, in the present invention, is zirconium.

In the compositions of the present invention, silica gel functions as a binder and sealer. Silica gel has three desirable characteristics:
1. it is a binder with the ability to adsorb moisture;
2. it accumulates finely divided solids;
3. it significantly reduces the leachability of the resultant solid precipitate.

Without being bound by theory, it is believed that the contaminants are trapped and adsorbed within the interstitial sites of the montmorillonite and illite clays. It is believed that the montmorillonite and illite clays, when added to the wastewater under agitation, form a sludge matrix which adsorbs the contaminants and enhances the stability of the sludge with the entrapped contaminants.

The polyelectrolytes in the compositions are either nonionic, cationic or anionic, or a combination of either nonionic and cationic or nonionic and anionic. Suitable polyelectrolytes for use in the treatment compositions of the present invention are Rhone poulenc 2J, 33J and CP-13. However, other polyelectrolytes, whether from Rhone poulenc or other manufacturers, may also be found to be suitable in the compositions of the present invention, thereby not limiting the polyelectrolytes to the above listed types.

The treatment compositions of the present invention are prepared by adding the various components proportionately together and blending same homogenously. Preferably, the lesser components such as the polyelectrolytes, sodium carbonate, boron, zirconium and silica gel are blended separately and are then added to the other components as one. However, all components may be added together individually and then blended homogenously without preblending of the lesser components. It was found that a preferable method of blending would be with the use of a V-shell blender or a continuous zig-zag blender such as are manufactured by Patterson Kelly.

Preferably, the components of the treatment compositions are of fine to standard commercial mesh. However, one or more parts may vary in mesh size.

The blended treatment composition is introduced into a baffled vessel containing the wastewater and agitated for a predetermined length of time, usually four minutes. Baffling of the treatment vessel is necessary to prevent a vortex and to insure a fine distribution of the treatment composition of the present invention throughout the wastewater. The amount of treatment composition to be added to the wastewater depends upon the concentration and types of contaminants present in the wastewater. After completion of the agitation phase, the floc with the adsorbed contaminants is allowed to settle in the same vessel. When the settling phase is completed, the supernatant, approximately three/fourths to four/fifths of the total volume in the treatment vessel, is drained and discharged to either a POTW or is discharged directly to a natural body of water or into the ground. A continuous monitoring of the treated water quality is necessary prior to discharge to natural bodies of water or into the ground. The remaining, approximately one/fourth to one/fifth of the treated water, with the settled sludge is discharged or pumped to a filtering/dewatering device, such as a filter press.

The treatment can be performed at either ambient or elevated temperatures. The treatment is usually performed at the temperature of the wastewater as it emanates from the source.

The treatment of the wastewater with the composition of the present invention can be performed in either a batch type operation or in a continuous process, as long as the reaction phase or the agitated phase of the water with the treatment composition is at least four minutes.

The following examples further illustrate the process and compositions of the present invention. It is to be understood that the examples are to be considered examplary and do not limit the scope of the invention. This invention utilizes a unique and novel combination of processes, namely, (1) Ion exchange
(2) Coagulation
(3) Colloidal dispersion
(4) Flocculation
(5) Adsorption
(6) Fixation within the clay layers
(7) Binding and sealing

EXAMPLE NO. 1

A treatment composition, having the components indicated in Table No. 1, was prepared in accordance with the present invention.

TABLE 1

| Component | Percent |
| --- | --- |
| Aluminum sulfate | 15.93 |
| Montmorillonite | 30.00 |
| Polyelectrolyte-nonionic | 3.53 |
| Sodium carbonate | 3.53 |
| Silica gel | 1.77 |
| Illite clay | 22.24 |
| Calcium hydroxide | 23.00 |

The prepared treatment composition was introduced into a wastewater with the contaminants indicated in Table No. 2.

TABLE 2

| Parameter | Concentration |
| --- | --- |
| Cu (copper) | 400.00 mg/l |
| Hg (mercury) | 43.00 mg/l |

After treatment with the composition as indicated in Table No. 1, the concentrations were as shown in Table No. 3.

TABLE 3

| Parameter | Concentration |
| --- | --- |
| Cu (copper) | 0.12 mg/l |
| Hg (mercury) | 0.48 mg/l |

A treatment composition having the components listed in Table No. 4 was prepared in accordance with the present invention.

TABLE 4

| Component | Percent |
| --- | --- |
| Aluminum sulfate | 15.00 |
| Sodium carbonate | 5.00 |
| Montmorillonite | 31.00 |
| Polyelectrolyte-anionic | 4.00 |
| Zirconium | 1.50 |
| Silica gel | 2.00 |
| Boron | 4.00 |
| Illite clay | 22.50 |
| Calcium hydroxide | 15.00 |

The prepared treatment composition shown in Table No. 4 was introduced into a wastewater having the contaminants listed in Table No. 5 at a dose of 1.0 g/l.

TABLE 5

| Parameter | Initial radionuclide concentration |
| --- | --- |
| Iodine-131 | 100.00 mg/l |
| Strontium-85 | 100.00 mg/l |
| Cesium-137 | 100.00 mg/l |
| Cobalt-60 | 100.00 mg/l |

The results listed in Table No. 6 indicate the removal of contaminants as listed in Table No. 5 after treatment with a dose of 1.0 g/l of the composition shown in Table No. 4.

TABLE 6

| Parameter | Radionuclide concentration |
| --- | --- |
| Iodine-131 | 4.70 mg/l |
| Strontium-85 | 7.80 mg/l |
| Cesium-137 | 2.00 mg/l |
| Cobalt-60 | 0.29 mg/l |

The results listed in Table No. 6 indicate an effective reduction of Cs-137 and Co-60 with the composition listed in Table No. 4.

A treatment composition having the components listed in Table No. 7 was prepared in accordance with the present invention.

TABLE 7

| Component | Percent |
| --- | --- |
| Aluminum sulfate | 12.63 |
| Sodium carbonate | 4.31 |
| Montmorillonite | 17.24 |
| Polyelectrolyte-nonionic | 1.72 |
| Zirconium | 0.86 |
| Silica gel | 6.90 |
| Boron | 4.31 |
| Illite clay | 34.79 |
| Calcium hydroxide | 17.24 |

The treatment composition shown in Table No. 7 was introduced into a wastewater containing Iodine-131 and Strontium-85 in concentrations of 100.00 mg/l each at a dose of 1.00 g/l which reduced the concentrations as indicated in Table No. 8.

TABLE 8

| Parameter | Radionuclide concentration |
| --- | --- |
| Iodine-131 | 3.9 mg/l |
| Strontium-85 | 5.2 mg/l |

A treatment composition of the present invention having the components listed in Table No. 9 was prepared.

TABLE 9

| Component | Percent |
| --- | --- |
| Aluminum sulfate | 13.0 |
| Sodium carbonate | 2.4 |
| Montmorillonite | 32.0 |
| Polyelectrolyte-nonionic | 3.0 |
| Polyelectrolyte-cationic | 1.0 |
| Zirconium | 2.0 |
| Silica gel | 3.0 |
| Illite clay | 20.0 |
| Calcium hydroxide | 23.6 |

The treatment composition shown in Table No. 9 was introduced into a wastewater containing the contaminants listed in Table No. 10 at a dose of 3.0 g/l.

TABLE 10

| Parameter | Concentration |
| --- | --- |
| Barium | 20.0 mg/l |
| Cadmium | 33.0 mg/l |

TABLE 10-continued

| Parameter | Concentration |
| --- | --- |
| Chromium | 17,000.0 mg/l |
| Lead | 100.0 mg/l |

The results listed in Table No. 11 indicate the reduction of the contaminants listed in Table No. 10 after treatment with the composition listed in Table No. 9.

TABLE 11

| Parameter | Concentration |
| --- | --- |
| Barium | 0.8 mg/l |
| Cadmium | 0.032 mg/l |
| Chromium | 0.24 mg/l |
| Lead | 0.2 mg/l |

A treatment composition of the present invention as listed in Table No. 12 was prepared.

TABLE 12

| Component | Percent |
| --- | --- |
| Aluminum sulfate | 14.5 |
| Sodium carbonate | 3.2 |
| Montmorillonite | 34.9 |
| Polyelectrolyte-nonionic | 0.8 |
| Polyelectrolyte-anionic | 2.4 |
| Zirconium | 2.0 |
| Silica gel | 2.0 |
| Illite clay | 16.2 |
| Calcium hydroxide | 24.0 |

The treatment composition shown in Table No. 12 was introduced into a wastewater with the contaminants listed in Table No. 13.

TABLE 13

| Parameter | Concentration |
| --- | --- |
| Zinc | 65.0 mg/l |
| Chromium | 3.22 mg/l |
| Silver | 9.87 mg/l |
| Cadmium | 138.0 mg/l |
| Lead | 6.37 mg/l |
| Nickel | 7.14 mg/l |
| Barium | 8.96 mg/l |
| Iron | 1.38 mg/l |
| Beryllium | 1.08 mg/l |
| Manganese | 153.0 mg/l |
| Copper | 20.0 mg/l |
| Mercury | 2.52 mg/l |

The results listed in Table No. 14 indicate the reduction of the contaminants listed in Table No. 13 after treatment with the composition of the present invention as shown in Table No. 12 at a dose of 2.5 g/l.

TABLE 14

| Parameter | Concentration |
| --- | --- |
| Zinc | 0.05 mg/l |
| Chromium | 0.08 mg/l |
| Silver | 1.40 mg/l |
| Cadmium | 0.05 mg/l |
| Lead | 0.05 mg/l |

TABLE 14-continued

| Parameter | Concentration |
|---|---|
| Nickel | 0.05 mg/l |
| Barium | 2.01 mg/l |
| Iron | 0.05 mg/l |
| Beryllium | 0.05 mg/l |
| Manganese | 0.05 mg/l |
| Copper | 0.05 mg/l |
| Mercury | 0.06 mg/l |

What is claimed is:

1. A treatment composition for the removal of one or more heavy metals and radioactive isotopes from wastewater comprising:
   (a) 15 to 40% by weight of naturally occurring layered montmorillonite with a silica content of at least 60%
   (b) 11 to 36% by weight of illite clay
   (c) 5 to 35% by weight of aluminum sulfate
   (d) 5 to 35% by weight of calcium hydroxide
   (e) 1 to 5% by weight of one or more polyelectrolytes
   (f) 2 to 5% by weight of sodium carbonate
   (g) 1 to 5% by weight of boron
   (h) 1 to 5% by weight of zirconium
   (i) 1 to 8% by weight of silica gel.

2. A treatment composition of claim 1, wherein the total of montmorillonite and illite clay should be at least 50% by weight of the total composition.

* * * * *